Feb. 23, 1926.
S. STRANG ET AL
MILK COOLER
Filed March 23, 1925
1,574,179
2 Sheets-Sheet 1
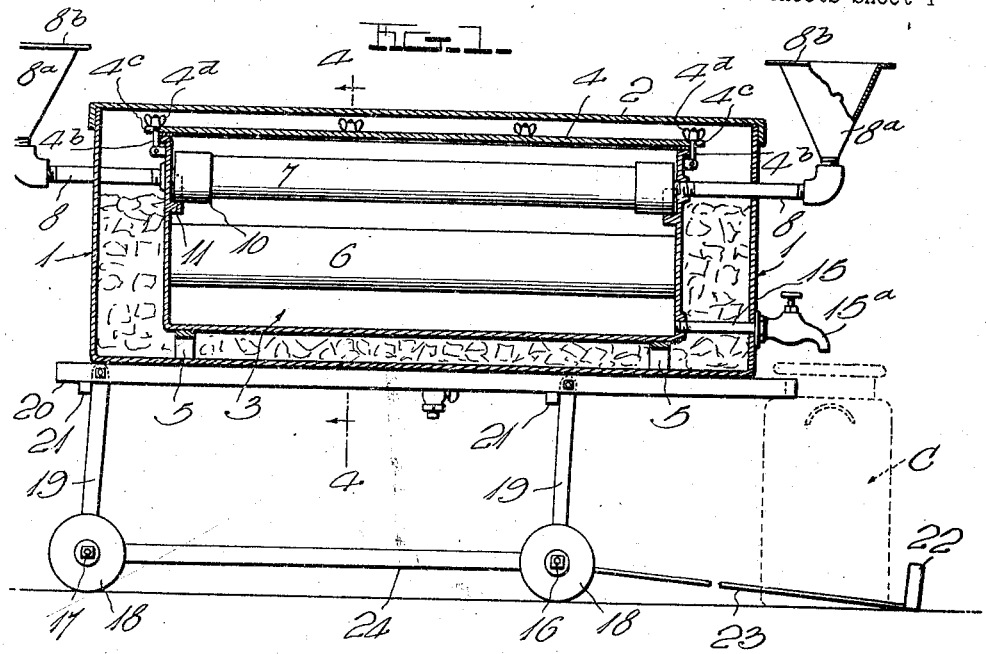
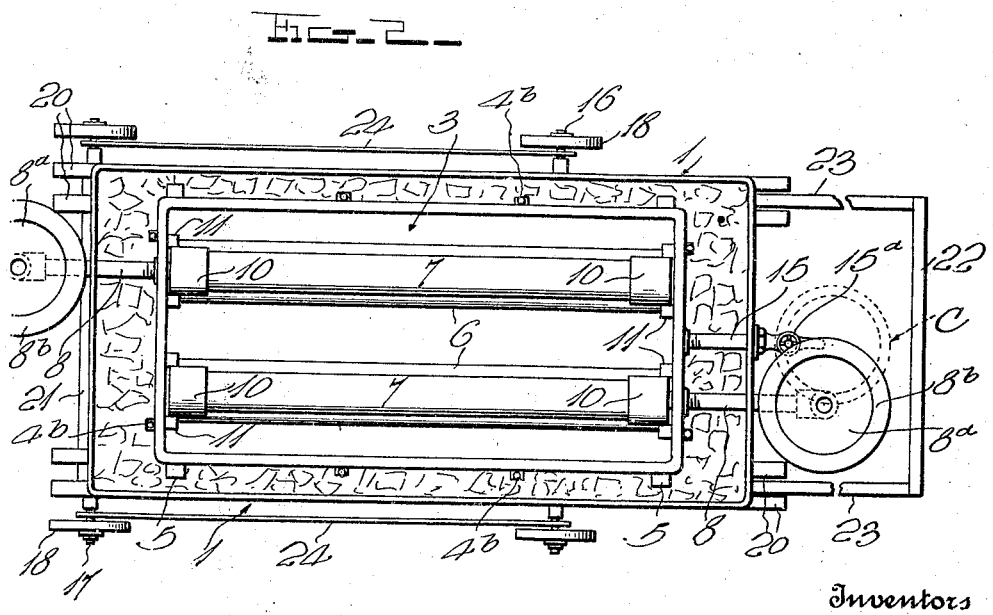
Witness
H. Woodard
Inventors
Seeley Strang
James A Dolan
By H. R. Wilson & Co.
Attorneys

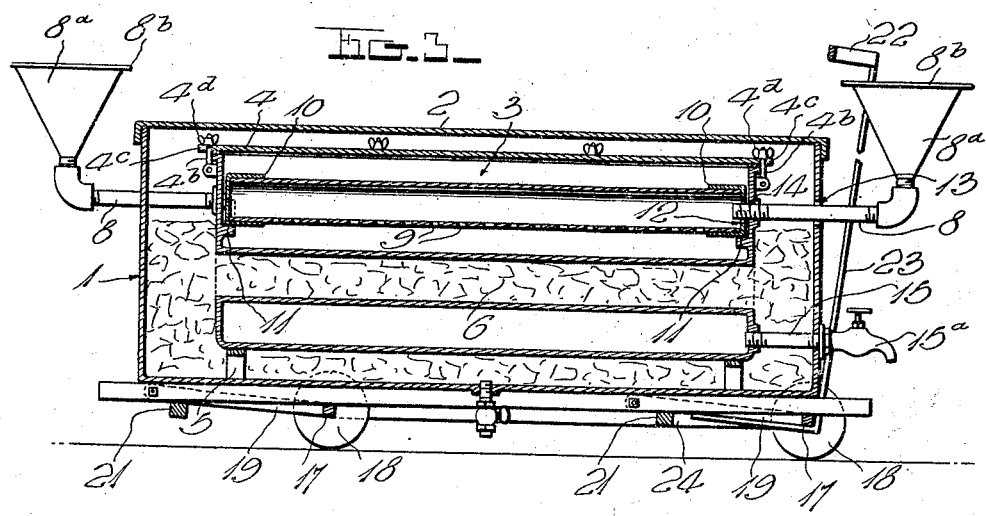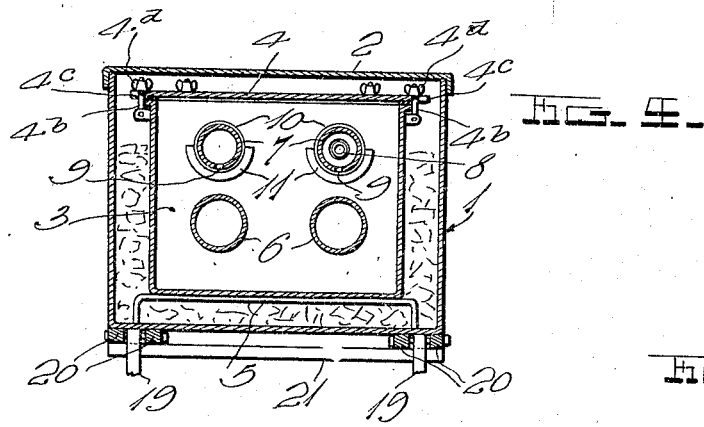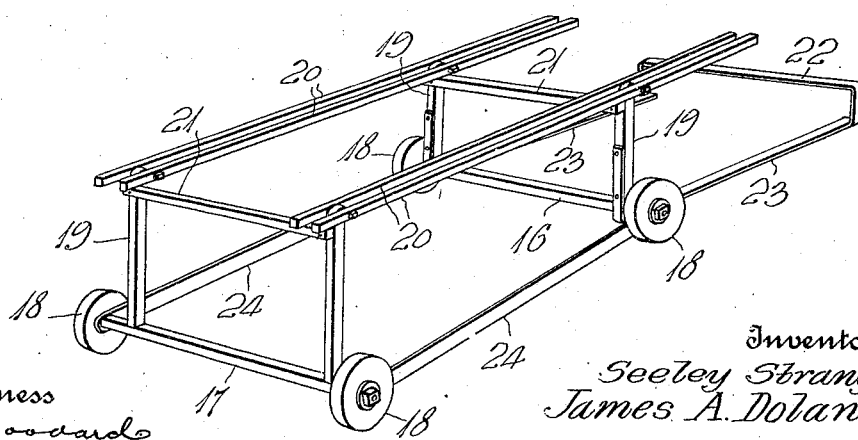

Patented Feb. 23, 1926.

1,574,179

UNITED STATES PATENT OFFICE.

SEELEY STRANG AND JAMES A. DOLAN, OF DOVER PLAINS, NEW YORK.

MILK COOLER.

Application filed March 23, 1925. Serial No. 17,775.

*To all whom it may concern:*

Be it known that SEELEY STRANG and JAMES A. DOLAN, citizens of the United States, residing at Dover Plains, in the county of Dutchess and State of New York, have invented certain new and useful Improvements in Milk Coolers; and they do declare the following to be a full, clear, and exact description of the invention, such as will enable others skilled in the art to which it appertains to make and use the same.

This application constitutes a continuation in part of our allowed U. S. application Sr. No. 668,636, filed October 15, 1923 and allowed Jan. 26, 1925 but formally abandoned on or about April 13, 1925, in favor of the present case.

It is well known that bacteria in milk will rapidly multiply from the time the milk is drawn from the cows until it is cooled, and as considerable time usually elapses between the milking and cooling operations, the bacteria count rises to such an extent as to greatly decrease the value of the milk. An object of our original application was to provide a novel form of milk cooler adapted to receive the milk directly from a milking machine, for the purpose of immediately cooling it and thus keeping the bacteria count at a minimum. This same object relates also to the present application.

Another object of both the original application and the present case, is to provide a cooler mounted on a truck for easy movement to the numerous points at which it is to be used, the truck being of such construction as to lower the cooler when receiving the milk and to raise it when the milk was to be discharged into a can or other receptacle.

In carrying out the invention, we employ an ice containing casing, a milk container within said casing having a milk chilling tube adapted to receive ice from the container, and a milk tube extending across the container over said milk chilling tube, said milk tube having an outlet for the milk. Further objects are to provide for making the milk container absolutely air tight when the cooler is coupled to a milking machine; to provide novel mounting means for the milk tube, permitting it to be readily taken out of the milk container and sterilized; to make provision whereby the entire milk container may be easily removed from the ice containing casing for sterilization; to provide a construction in which the supply of ice in the outside casing may be replenished if necessary while the cooler is receiving milk, without the necessity of disturbing the air tight nature of the milk container; to provide a construction which readily adapts the cooler for use with the ordinary pulsator of a milking machine; and to provide a cooler which will be generally desirable and efficient.

With the foregoing in view the invention resides in the novel subject matter hereinafter described and claimed, the description being supplemented by the accompanying drawings.

Figure 1 is a longitudinal sectional view partly in elevation, showing the ice casing, the milk container and associated parts in raised position to discharge milk into a can or other receptacle.

Figure 2 is a top plan view with the removable covers of the ice casing and the milk container detached.

Figure 3 is a vertical longitudinal section illustrating the ice casing, the milk container and associated parts lowered in position to receive milk from a milking machine.

Figure 4 is a vertical transverse sectional view as indicated by line 4—4 of Figure 1.

Figure 5 is a perspective view of the truck.

In the form of construction selected for illustration in the present application, the numeral 1 designates an ice containing casing having a removable cover 2, said casing being preferably though not necessarily of rectangular form. Within the casing 1 and in spaced relation with its several walls, is a milk container 3 having a removable cover 4, a gasket 4$^a$ of rubber or other desired material, being preferably interposed between said cover and the body portion of the container 3. To normally hold the cover 4 tightly closed, yet to permit it to be easily detached when desired, any suitable means may be employed. For illustrative purposes, we have shown bolts 4$^b$ pivoted to the exterior of the container body and swingable into and out of notches 4$^c$ in the edge portion of the cover 4, said bolts having thumb nuts 4$^d$.

The bottom of the milk container 3 is provided with appropriate supports 5 which may well be in the form of arched bars to rest upon the bottom of the ice casing 1, so as to support said container in spaced relation with the bottom of said casing. The supports 5 may either be secured to the container 3 or the casing 1, but they are preferably free of attachment with one or the other, so that the entire container may be removed from the casing for sterilizing purposes.

Extending horizontally across the casing 3 from one end wall thereof to the opposed end wall, we have shown a pair of milk chilling tubes 6 which communicate with the casing 1 to receive ice from the latter. Above these tubes 6, two milk tubes 7 have been shown extending from end to end of the container 3, said tubes being adapted to receive milk from two pipes 8 when the cooler is receiving milk from two milking machine pulsators. If only one pulsator is to be used with the machine however, only one of the pipes 8 and one of the tubes 7 will function and the other pipe 8 will then be plugged. Along its lower side, each milk tube 7 is formed with milk discharge perforations 9 which direct the milk downwardly onto the chilling tube 6, so that the milk may run around the exterior of the latter in a thin film, and will thus be effectively chilled as soon as it is discharged. Moreover, it will be seen that this chilled in-coming milk is maintained at a low temperature by the ice surrounding the container 3.

In the preferred form of construction, the ends of each milk tube 7 are closed by removable caps 10 which preferably fit frictionally over said ends. These caps are removably engaged with seats 11 which are provided on the inner sides of the end walls of the milk container 3, said seats being preferably U-shaped as shown in Figure 4. One cap 10 of each tube 7, is formed with an opening 12 to loosely receive the inner end of the adjacent milk inlet pipe 8, this pipe being passed through an opening 13 in the wall of the ice casing 1, and being threaded as at 14 through an opening in the milk container wall, but passing loosely through the opening 12. By this association of parts, each pipe 8 may readily be removed, so that the tubes 7 may be taken from the apparatus for sterilizing purposes, it being obvious that the cap 10 may be removed to permit a more thorough cleaning of the tubes.

The outer end of each milk inlet pipe 8 is provided with a milk receiver 8ª which is preferably of funnel-shape, the rim 8ᵇ of the receiver being of a size and shape to readily co-act with the usual gasket on the lower side of a milking machine pulsator, in exactly the same manner as the gasket commonly co-acts with the rim of a milk bucket used in connection with the pulsator.

The milk container 3 is provided with an appropriate milk outlet pipe 15 having a spigot 15ª, one or both of these parts being preferably detachable by an appropriate threaded joint, so that they will not interfere with removal of the container 3 from the ice casing 1.

When a large number of cows must be milked and the milk received by the cooler it is necessary that the latter be mounted for easy movement from one place to another. Furthermore, it is necessary, in order that the milk can be properly discharged into the container, to dispose the cooler at a relatively low position, so that the milking machine pulsator or pulsators may effectively operate and discharge the milk. When the contents of the container 3 must be discharged, for instance into an ordinary can C, the cooler must be raised sufficiently to permit the insertion of the can or other receptacle under the spigot 15ª. To accomplish all of these results, we make use of a single truck structure which is preferably, although not necessarily, of the form shown. We have illustrated front and rear axles 16 and 17 having suitable rollers or wheels 18. Posts 19 rise rigidly from the axles 16 and 17 and are pivoted at their upper ends to longitudinal bars 20, the posts of each axle being connected by a transverse bar 21 which abuts the lower edges of the bars 20 when the truck is in raised position, as seen in Fig. 1, the posts 19 being then slightly beyond dead center, as shown. A suitable U-shaped tongue or handle 22, has its ends 23 suitably secured to the front posts 19 or to the front axle 17, and longitudinal bars 24 connect the two axles. It will be observed that by pulling upwardly upon the tongue or handle, to the position shown in Fig. 3, the front posts 19 will be tilted, and the bars 20 and 24 will produce tilting of the rear posts 19. Thus, the entire truck structure is vertically collapsed to lower the tank 1 and the parts associated therewith.

When the apparatus is in a lowered position as shown in Figs. 3 and 4, it is in readiness to receive milk from the milking machine pulsator or pulsators and it will effectively cool such milk and retain it at a low temperature until its capacity is reached. Then, the truck is vertically extended to elevate the apparatus, a can or the like is inserted under the spigot 15, and the contents of the container 3 are drawn off and immediately carried to a refrigerating chamber, unless the milk is to be immediately hauled or shipped to its destination.

The device is simple and inexpensive, yet is highly efficient and in every way desirable, and as excellent results may be obtained from the general construction shown, it may well be followed, but within the scope of the invention as claimed, numerous changes may be made. If desired, a small hand-carried device may be made for hand milking.

We claim:

1. A milk cooler comprising an ice containing casing, a milk container mounted in said casing in spaced relation with the walls thereof, a horizontally extending milk chilling tube in said milk container communicating with said casing to receive ice therefrom, and milk inlet means for the container positioned to direct the incoming milk downwardly onto the chilling tube whereby the milk may run by gravity in a thin film around the exterior of the tube before running therefrom into the container.

2. A milk cooler comprising an ice containing casing, a milk container mounted in said casing in spaced relation with the walls thereof, a milk chilling tube in said milk container communicating with said casing to receive ice therefrom, and a milk tube extending across said milk container over said chilling tube, said milk tube having a milk inlet and being formed with outlet perforations for discharging the milk onto said chilling tube.

3. A structure as specified in claim 2; opposed walls of said milk container being provided with seats removably engaged by the ends of the milk tube to support the latter, said milk container having a removable top.

4. A structure as specified in claim 2; said milk tube having removable caps on its opposite ends abutting opposed walls of the milk container, said walls having seats engaging portions of said caps to removably support the milk tube, said milk container having a removable top.

5. A structure as specified in claim 2; said milk container being air-tight being provided with a removable top and having seats on the inner sides of two of its opposed walls, said seats removably engaging the ends of the milk tube to support the latter, the aforesaid milk inlet of said milk tube comprising a pipe passing air-tightly yet removably through one of said walls of the milk container and passing removably through the adjacent wall the ice containing casing, the inner end of said pipe being removably received in one end of said milk tube.

In testimony whereof we have hereunto affixed our signatures.

SEELEY STRANG.
JAMES A. DOLAN.